Patented Jan. 30, 1951

2,540,057

UNITED STATES PATENT OFFICE 2,540,057

AROMATIC AND HETEROCYCLIC DIAZOSULFONES

Joseph A. Sprung and Willy A. Schmidt, Easton, Pa., assignors to General Aniline & Film Corporation, New York, N. Y., a corporation of Delaware No Drawing. Application July 2, 1947, Serial No. 758,703

3 Claims. (Cl. 260—141)

This invention relates to a new class of azo dye intermediates. More particularly, it relates to aromatic and heterocyclic diazosulfones of the following formulae:

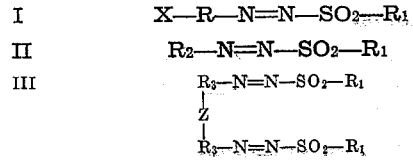

In these formulae XR stands for an amino substituted aryl radical in which R represents the aryl portion, as for example, a phenyl, naphthyl, biphenyl, tolyl, salicyl, xylyl or anisyl radical, and X represents the amino substituent such as methylamino, diethylamino, $\beta,\beta'$-dihydroxyethylamino, N-methyl-N-$\beta$-hydroxyamino, phenylamino, benzylamino, morpholino, piperazino, indolino, acetamido, methansulfonamido, benzamido and benzenesulfonamido groups; $R_1$ stands for an alkyl radical such as methyl, ethyl, butyl, lauryl and octadecyl; an amino aryl radical such as aminophenyl, an alkoxyaryl radical such as ethoxyphenyl; an acylamino aryl radical such as acetamidophenyl; or a heterocyclic radical such as a quinolyl, carbazyl, oxazyl and indolyl radical; $R_2$ stands for a heterocyclic radical such as above; $R_3$ stands for an aryl radical such as above; and Z stands for a carbon-to-carbon linkage, an alkylene radical such as methylene, an arylated alkylene radical such as benzyl, and for the elements, oxygen and sulfur; and such groups containing water solubilizing groups of the class consisting of sulfo, carboxy and polyoxyethylene groups.

The diazosulfones of this class may readily be prepared by the reaction of a diazonium compound which has been prepared by diazotization of an aromatic or heterocyclic amine and an organic sulfinic acid which has been prepared by the reduction of an organic sulfonylchloride which in turn can be readily prepared by chlorosulfonation of organic compounds or by the action of phosphorus pentachloride on organic sulfonic acids. These diazosulfones, unlike the diazonium compounds from which they are derived, are soluble in organic solvents and are more stable than the diazonium compounds. Unlike the related diazosulfonic acids or diazosulfonates (R—N=N—SO₂OH or R—N=N—SO₂—OMe)

they will couple with azo dye coupling components under alkaline conditions in the absence of ultraviolet radiation. In the case of the diazosulfonic acids or diazosulfonates, it is necessary to expose the intermediate to ultraviolet radiation before coupling will take place. The probable mechanism of the diazosulfone coupling reaction yielding azo dyes is as shown by the following equation:

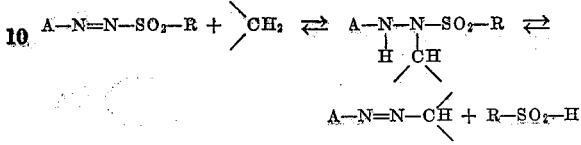

It is believed that the active methylene group of the color former or coupling component adds to the polarized azo linkage in the diazosulfone and that a sulfinic acid is subsequently split out to give the azo dye. The types of coupling components which are required for the formation of azo dyes from these diazosulfones are, in general, those which are aromatic in nature, possessing directing groups such as phenolic, hydroxyl, alkoxy, amine, amino, alkylamino, arylamino and the like, and possessing replaceable hydrogen atoms in the coupling position ortho or para to the directing group or they may be compounds possessing reactive methylene groups such as those which are known to undergo the coupling reactions with diazonium salts. Those diazosulfones in which the substituent X is electronegative in character, such as sulfonic acid, nitro and carboxyl acid groups, form azo dyes with extreme difficulty, whereas those diazosulfones where the substituent X is more electropositive than hydrogen, such as amino, alkoxy and alkylamino groups, perform the coupling reaction readily and in a manner resembling that of the corresponding diazonium salts.

In the production of azo dyes for textile printing, a wide color range of azo dyes can be obtained by choice of suitable components. Due to the greater inherent resonance of polyazo dyestuffs and their resultant deeper color, it has been found desirable to use difunctional diazosulfones in order to obtain the bisazo dye images of the desired color. Since many of the diazosulfones that are substituted with strongly electropositive substituents are decomposed by ultraviolet light, they also may be used as the light sensitive element in diazotype printing processes. These diazosulfones are also useful as intermediates for the preparation of sulfonhydrazides. The reduction of a diazosulfone with zinc and acetic acid yields the corresponding sulfonhydrazide in accordance with the following equation:

$$A-N=N-SO_2-B \xrightarrow{[H]} A-NH-NH-SO_2B$$

Specifically suitable diazosulfones of the class represented by the above Formulae I, II and III include among others:

*Compounds under Formula I*

1. 4 - benzamidobenzenediazo - (4 - acetamidophenyl) -sulfone

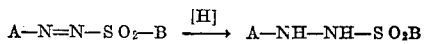

2. 4 - acetamidobenzenediazo - [4 - ($\beta'$ - sulfoethoxy) -phenyl]-sulfone sodium salt

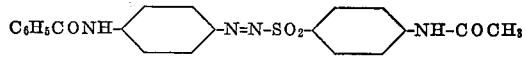

3. 4 - diethylaminobenzenediazo - (p - aminophenyl) -sulfone

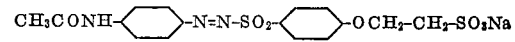

4. Diphenylamine - 4 - diazo - (p - aminophenyl) -sulfone

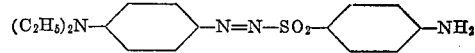

5. 4 - (N - benzylamino) - benzenediazo - (p - aminophenyl) -sulfone

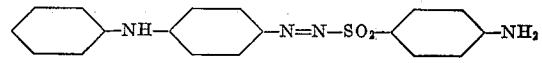

6. 4 - morpholinobenzenediazo - (p - aminophenyl) -sulfone

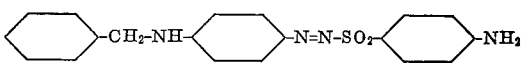

7. 4 - diphenylaminediazo - (8 - quinolyl) - sulfone

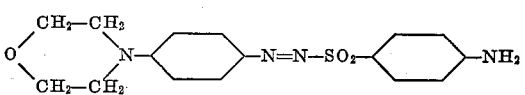

8. 2,4 - dimethyl - 5 - benzamidobenzenediazo - (9-ethyl-3-carbazolyl) -sulfone

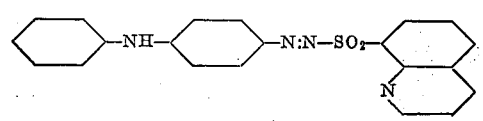

9. 2 - methoxy - 4 - benzamido - 5 - methylbenzenediazo-(4-acetamidophenyl) -sulfone

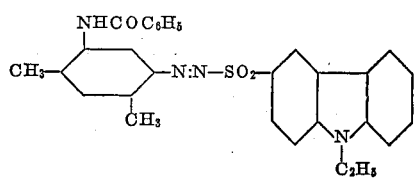

10. 2,4 - dimethyl - 5 - benzamidobenzenediazo - (4-ethoxyphenyl) -sulfone

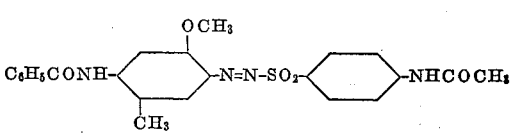

11. 2,5 - dimethoxy - 4 - benzamidobenzenediazo - (4-acetamidophenyl)-sulfone

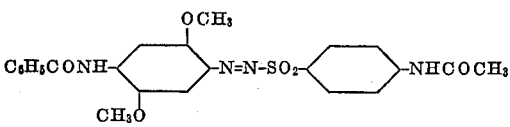

12. 2,5 - diethoxy - 4 - benzamidobenzenediazo - (p-acetamidophenyl) -sulfone

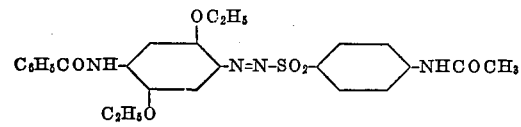

13. 2,5 - diethoxy - 4 - benzamidobenzenediazo - (4-aminophenyl) -sulfone

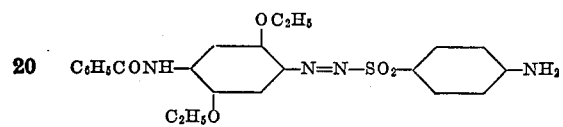

14. 2,4 - dimethyl - 5 - benzamidobenzenediazo - (4-acetamidophenyl) -sulfone

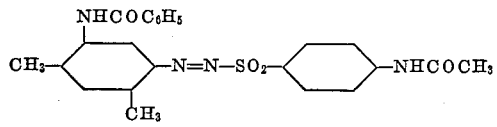

15. 2,4 - dimethyl - 5 - benzamidobenzenediazo - [4-($\beta'$-sulfoethoxy)-phenyl]-sulfone (sodium salt)

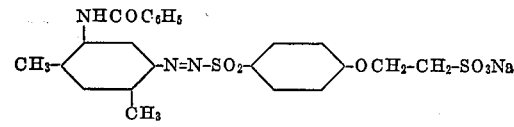

16. 2,5 - diethoxy - 4 - benzamidobenzenediazo - [4-($\beta$-sulfoethoxy)-phenyl]-sulfone (sodium salt)

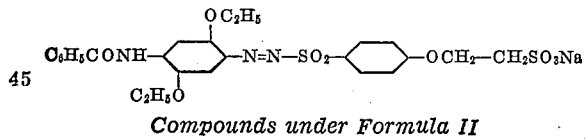

*Compounds under Formula II*

1. Quinoline-5-diazo-(n-octadecyl) -sulfone

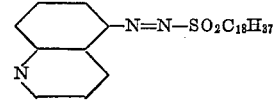

2. 9-ethylcarbazole-3-diazo-(ethyl) -sulfone

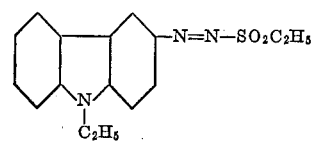

3. Benzoxazole - 5 - diazo - (4 - acetamidophenyl) -sulfone

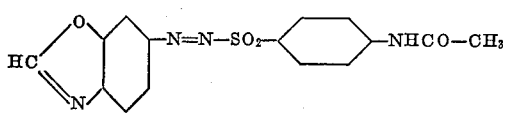

4. Quinoline - 6 - diazo - (4 - methoxyphenyl) - sulfone

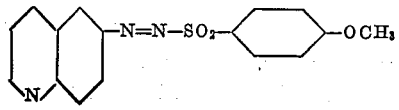

5. 9 - ethylcarbazole - 3 - diazo - (8 - quinolyl) - sulfone

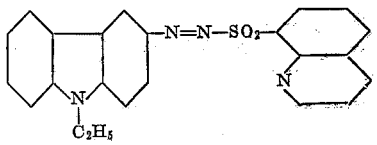

6. Benzothiazole - 5 - diazo - (9 - ethyl - 3 - carbazolyl) -sulfone

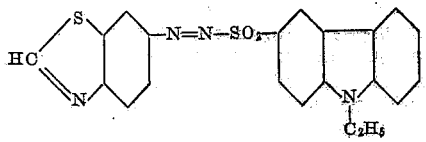

*Compounds under Formula III*

1. 4,4' - biphenylene - bis - diazo - (methyl) - sulfone

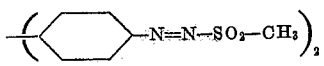

2. 3,3' - dimethyl - 4,4' - biphenylene - bis - diazo-(p-acetamidophenyl)-sulfone

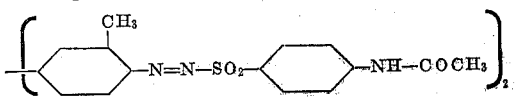

3. 2,2' - dimethyl - 4,4' - biphenylene - bis - diazo-(4-acetamidophenyl)-sulfone

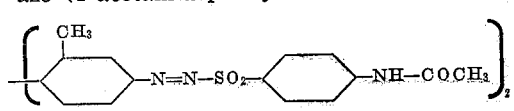

4. 3,3' - dimethoxy - 4,4' - biphenylene - bis - diazo-(phenyl)-sulfone

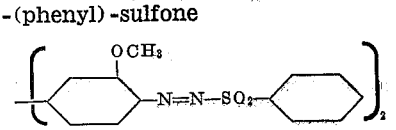

5. 3,3' - dimethoxy - 4,4' - biphenylene - bis - diazo-(4-acetamidophenyl)-sulfone

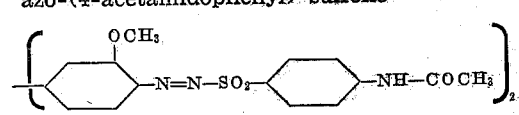

6. 3,3' - dimethoxy - 4,4' - biphenylene - bis - diazo-(4-ethoxyphenyl)-sulfone

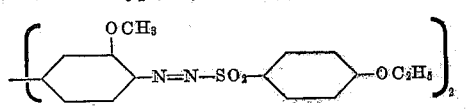

7. 3,3' - dimethoxy - 4,4' - biphenylene - bis - diazo-[4-(β-sulfoethoxy)-phenyl]-sulfone (disodium salt)

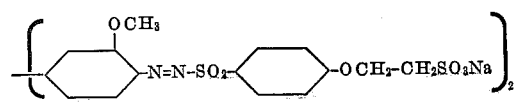

8. 3,3' - dicarboxymethoxy - 4,4' - biphenylene - bis-diazo-(4-acetamidophenyl)-sulfone

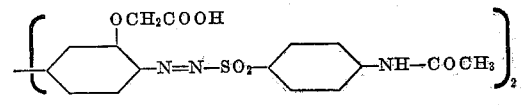

9. 3,3' - dimethoxy - 4,4' - biphenylene - bis - diazo-(p-acetamidophenyl)-sulfone

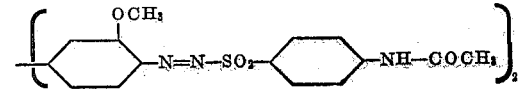

10. 3,3' - dimethoxy - 4,4' - biphenylene - bis - diazo-(4-aminophenyl)-sulfone

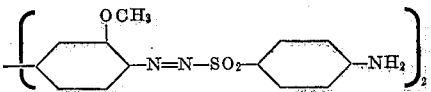

11. 4,4' - diphenylmethane - bis - diazo - [4 - (β''-sulfoethoxy)-phenyl]-sulfone (disodium salt)

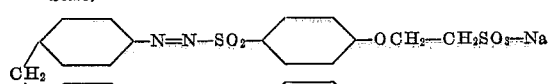

12. 3,3' - diphenylmethane - bis - diazo - (4 - acetamidophenyl)-sulfone

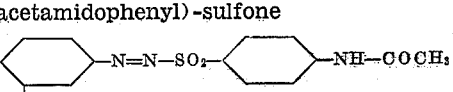

13. 4,4' - diphenylmethane - bis - diazo - (4 - acetamidophenyl) -sulfone

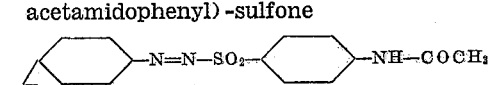

14. 2,2',5,5' - tetramethoxytriphenylmethane - 4,4'-bis-diazo-(p-acetaminophenyl)-sulfone

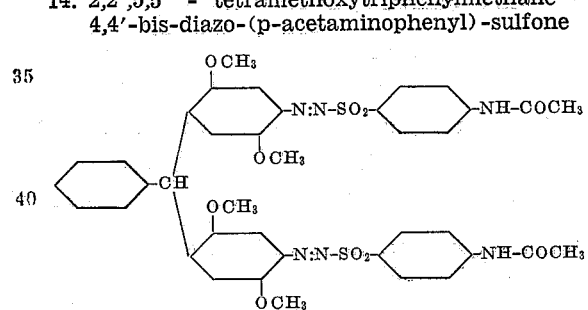

15. Phenyloxide - 4,4' - bis - diazo - (methyl) - sulfone

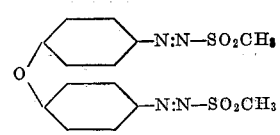

16. 3,3 - dimethoxy - 4,4' - biphenylene - bis - diazo-(8-quinolyl)-sulfone

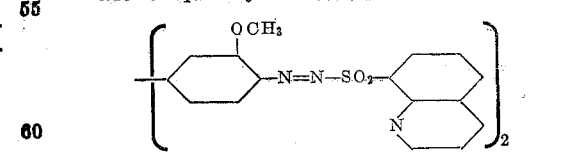

17. 4,4' - diphenylmethane - bis - diazo - (9 - ethyl-3-carbazolyl)-sulfone

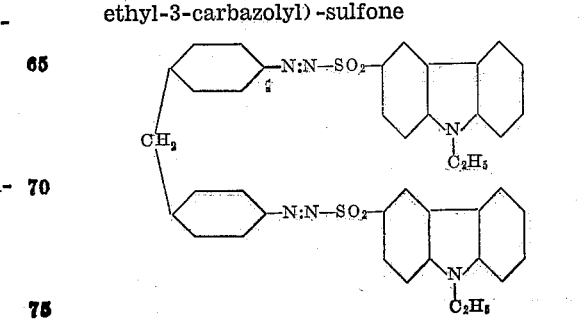

As indicated above, diazosulfones may be readily prepared according to the following methods:

(a) Oxidation of β-arylsulfonhydrazides
(b) Condensation of a diazo derivative with a sulfinic acid
(c) Condensation of a diazonium salt with a sulfonamide, and
(d) Decomposition of a diazo thiosulfonate.

The respective reactions involved in these methods of preparation are as follows:

(a) Oxidation of a β-arylsulfonhydrazide

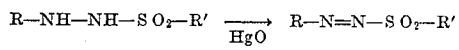

(b) Condensation of a diazo derivative with a sulfinic acid
(1) R—N=N—X+R'—SO₂—H→
R—N=N—SO₂—R'+H—X
(2) R—N=N—C—N+R'—SO₂H→
R—N=N—SO₂R'+H—C—N
(3) R—N=N—N—H—R''+2R'SO₂H→
R—N=N—SO₂R'+R''NH₃⁺—(SO₂R')⁻

(c) Condensation of a diazonium salt with a sulfonamide
R—N=N—X+R'—SO₂—NH₂→
R—N₃+H—X+R'—SO₂H
R—N=N—X+R'—SO₂H→
R—N=N—SO₂—R'+H—X (d) Decomposition of a diazo thiosulfonate
R—N=N—X+K—S—SO₂—R'→
R—N=N—(S—SO₂—R')
R—N=N—(S—SO₂—R')→
R—N=N—SO₂—R'+S The (b) method of condensing a diazo derivative with a sulfinic acid was found the most suitable and that is used in most of the following specific examples which will serve to further illustrate the invention. Unless otherwise specified, the quantities given in these examples are in parts by weight.

*Example 1*

2,5-diethoxy-4-benzamido-benzenediazo-(p-acetaminophenyl)-sulfone

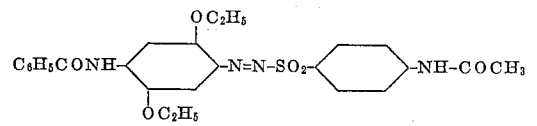

A suspension of 8.4 parts of 2,5-diethoxy-4-benzamidoaniline hydrochloride in 2.4 parts concentrated hydrochloric acid, 10 parts formic acid and 100 parts water is diazotized with a solution of 1.8 parts sodium nitrite in 10 parts water. The excess nitrous acid is destroyed with sulfamic acid and the filtered diazonium salt solution is added to a solution of 5.2 parts of p-acetamidobenzenesulfinic acid and 1.62 parts sodium carbonate monohydrate in 100 parts water. The orange colored precipitate is removed by filtration, washed well with water and air dried. The product, amounting to 11.3 parts (89%), melts with decomposition at approximately 110° C.

*Example 2*

4-diethylaminobenzenediazo-(p-aminophenyl)-sulfone

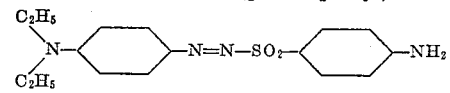

A solution of 20.0 parts p-diethylaminoaniline hydrochloride in 75 parts water and 24 parts concentrated hydrochloric acid is diazotized with a solution of 6.9 parts sodium nitrite in 75 parts water and added to a solution of 15.7 parts 4-aminobenzenesulfinic acid, 6.2 parts sodium carbonate monohydrate, 41.0 parts sodium acetate trihydrate and 250 parts water. The resulting mixture is allowed to remain overnight in an icebox and on the following day the orange colored precipitate is removed by filtration, washed well with water and air dried. The product, amounting to 29.5 parts (89%), melts over a wide range with decomposition.

*Example 3*

4-acetamidobenzenediazo-(phenyl)-sulfone

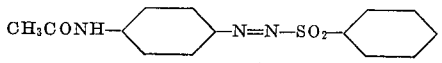

A suspension of 15.0 parts of p-aminoacetanilide in a solution of 10.8 parts concentrated hydrochloric acid, 37 parts formic acid in 150 parts water is diazotized with a solution of 7.2 parts of sodium nitrite in 50 parts water. The excess nitrous acid is destroyed with sulfamic acid and the filtered diazonium salt solution is added to a solution of 17.2 parts sodium benzenesulfinate in 50 parts water. After one hour, the solid diazosulfone is removed by filtration and washed with 500 parts water. The air-dried material amounts to 26.0 parts (86%).

*Example 4*

4-acetamidobenzenediazo-[4-(β'-sulfoethoxy)-phenyl]-sulfone (sodium salt)

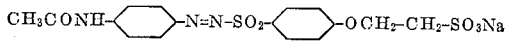

A suspension of 1.36 parts of p-aminoacetanilide in 3.7 parts formic acid and 10 parts water is diazotized with a solution of 0.69 part sodium nitrite in 5 parts water. The excess nitrous acid is destroyed with sulfamic acid and the filtered diazonium salt solution is poured into a solution of 3.10 parts of the di-sodium salt of β-(p-sulfinophenoxy)-ethanesulfonic acid in 5 parts water. Eighty parts of absolute ethanol is added and the precipitated diazosulfone is removed by filtration and washed with absolute ethanol and acetone. The yield is 2.9 parts (64%).

*Example 5*

3,3'-dimethoxy-4,4'-biphenylene-bis-diazo-[4-(β''-sulfoethoxy)-phenyl]-sulfone (sodium salt)

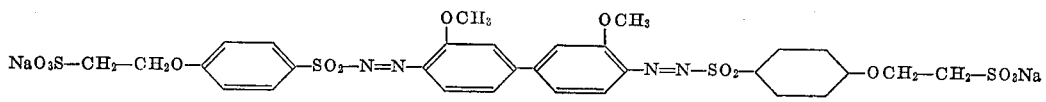

A solution of 100.5 parts of β-phenoxyethyl bromide (prepared by the method of "Organic Syntheses," Coll. Vol. I (2nd ed.), p. 436, note 6) in 500 parts of chloroform was cooled to 0° C. (ice salt bath) and treated with 250 parts chlorosulfonic acid at such a rate that the temperature was not allowed to rise above 5.0° C. The addition of the first mole of chlorosulfonic acid was accompanied by a rapid rise in temperature and a copious evolution of hydrogen chloride. Although the remainder of the chlorosulfonic acid was added very rapidly, no appreciable rise in temperature was noted. The reaction mixture was poured into ice water and the chloroform layer was separated. The aqueous layer was extracted once with 50 parts of chloroform and the combined chloroform extract was washed once with 250 parts of cold water. After the chloroform solution had been dried over anhydrous sodium sulfate, the chloroform was removed by distillation (steam bath), and the liquid residue was digested with 240 parts of cold low-boiling petroleum ether. The solid was removed by filtration and dried in a vacuum desiccator over sodium hydroxide. The compound, 4-(β-bromethoxy)-benzenesulfonyl chloride, amounted to 124 parts (82% yield) and melted at 65° C.

To a well-stirred suspension of 120.0 parts of finely powdered 4-(β-bromethoxy)-benzenesulfonyl chloride and 63.0 parts of anhydrous sodium sulfite in 1000 parts water, there was added 10% sodium hydroxide solution at such a rate that the pH of the solution was maintained at 8-9. About 286 parts of 10% sodium hydroxide was required. After the mixture had been stirred for about 4 hours, all but 4.0 parts of the sulfonyl chloride had dissolved, and the pH of the solution remained constant. The cooled, filtered solution was acidified with 83 parts of conc. hydrochloric acid, and the precipitated material was removed by filtration. The crude sulfinic acid was redissolved in 250 parts of 10% sodium carbonate solution and 1000 parts of water and was reprecipitated with 60 parts of conc. hydrochloric acid. The solid material was removed by filtration, washed with a small amount of cold water and dried on a porous plate. The compound, 4-(β-bromethoxy)-benzenesulfinic acid, amounted to 75 parts (71% yield) and melted between 80 and 90° C., depending on the rate of heating.

Sixty-six parts of 4-(β-bromethoxy)-benzenesulfinic acid were added to a solution of 16.0 parts of sodium carbonate monohydrate in 250 parts water. When carbon dioxide was no longer evolved, 33.0 parts of anhydrous sodium sulfite was added and the whole was refluxed for 1.5 hours. The solution was concentrated to about half its volume and then treated with 320 parts of absolute ethanol. After the mixture had been allowed to remain in an ice bath for 1 hour, the product which separated was removed by filtration. The filter cake was washed once with a cold solution of 15 parts water in 40 parts absolute ethanol. The di-sodium salt of β-(4-sulfinophenoxy)-ethanesulfonic acid, after drying in an oven at 105° C., amounted to 64.0 parts (83%) yield.

A warm solution of 3.17 parts of pure dianisidine dihydrochloride in 2.4 parts of formic acid and 15 parts water was cooled to 5° C. and diazotized with 1.44 parts of sodium nitrite in 5.0 parts of water. The excess nitrous acid was destroyed with sulfamic acid and the filtered diazonium salt solution was poured into a solution of 6.5 parts of the di-sodium salt of β-(4-sulfinophenoxy)-ethanesulfonic acid in 10.0 parts of water. Eighty parts of absolute ethanol were added and the material, which separated, was removed by filtration. The compound, 3,3'-dimethoxy-4,4'-biphenylene-bis-diazo-[4-β''-sulfoethoxy)-phenyl]-sulfone was digested with 80 parts of acetone and air dried. The yield is 6.8 parts (81%).

Example 6

4,4'-diphenylmethane-bis-diazo-[4-(β'-sulfoethoxy)-phenyl]-disulfone (sodium salt)

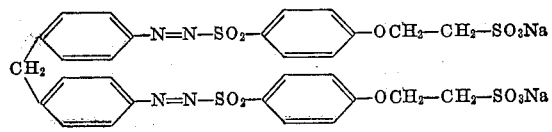

A suspension of 1.98 parts of 4,4'-diaminodiphenylmethane in 3.7 parts formic acid, 4.8 parts conc. hydrochloric acid and 10 parts water is diazotized with a solution of 1.40 parts sodium nitrite in 5 parts water. The filtered diazonium salt solution is poured into a solution of 6.2 parts of the disodium salt of β-(4-sulfinophenoxy)-ethanesulfonic acid in 10 parts water. Eighty parts of absolute ethanol is added, and the precipitated diazosulfone is removed by filtration and washed with absolute ethanol and acetone. The yield is 7.0 parts (88%).

Example 7

4,4'-diphenylmethane-bis-diazo-(4-acetamidophenyl)-disulfone

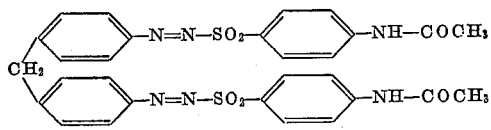

A solution of 3.96 parts of 4,4'-diaminodiphenylmethane in 7.2 parts formic acid in 10 parts conc. hydrochloric acid and 50 parts water is diazotized with an aqueous solution of 2.8 parts sodium nitrite. The excess nitrous acid is destroyed with sulfamic acid and the filtered diazonium salt solution is poured into a solution of 8.4 parts of p-acetamidobenzenesulfinic acid and 2.7 parts sodium carbonate monohydrate in 50 parts water. The diazosulfone was removed by filtration, washed well with water and air dried. The yield is 10.5 parts (84%).

Example 8

3,3'-dimethoxy-4,4'-biphenyl-bis-diazo-(4-acetamidophenyl)-disulfone

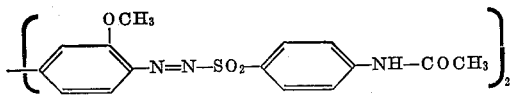

A solution of 3.17 parts of dianisidine dihydrochloride in 6 parts formic acid and 25 parts water is diazotized with a solution of 1.44 parts of sodium nitrite in 10 parts water. The excess nitrous acid is destroyed with sulfamic acid, and the filtrated diazonium salt solution is poured into a solution of 4.0 parts of p-acetamidobenzenesulfinic acid and 1.24 parts of sodium carbonate monohydrate in 25 parts water. The diazosulfone is removed by filtration, washed well with water and dried in a vacuum desiccator over phosphorous pentoxide. The yield is 5.4 parts (81%).

We claim:
1. Diazosulfones having the following formula:

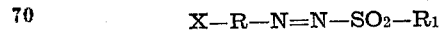

X—R—N=N—SO$_2$—R$_1$ wherein XR represents an amino substituted aryl radical; R$_1$ is a member of the group consisting of aminoaryl, alkoxyaryl, acylaminoaryl and heterocyclic radicals.

2. An aromatic diazosulfone of the following formula

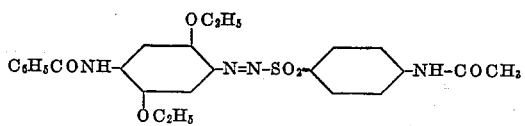

3. An aromatic diazosulfone of the following formula

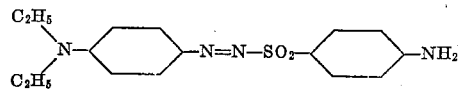

JOSEPH A. SPRUNG.
WILLY A. SCHMIDT.

REFERENCES CITED

The following references are of record in the file of this patent:

FOREIGN PATENTS

| Number | Country | Date |
|---|---|---|
| 12,872 | Great Britain | of 1900 |

OTHER REFERENCES

Hantzsch: Ber., v. 31 (1898), pp. 636–642, 7 pages.

Troeger et al.: J. Prakt. Chem. Sec., Series Vol. 62 (1900), pages 381-382, 2 pages.

Ber. Deut. Chem., vol. 10 (1877), pp. 1531–1534.

Ber. Deut. Chem., vol. 30 (1897), pp. 314 to 319.

Jrl. Chem. Soc. (London), 1936, pp. 1242–44.

Saunders: "The Aromatic Diazo Compounds and Their Technical Application" (1936), pp. 48 to 50.

Hans Meerwein et al.: Chem. Abst., vol. 33 (1939), page 6262.

Claasz: Chem. Abst., vol. 5 (1911), page 3063.